(12) United States Patent
Xie et al.

(10) Patent No.: US 11,747,545 B2
(45) Date of Patent: Sep. 5, 2023

(54) ELECTRONIC DEVICE

(71) Applicant: VIVO MOBILE COMMUNICATION CO., LTD., Dongguan (CN)

(72) Inventors: Xiang Xie, Dongguan (CN); Xiang Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/869,768

(22) Filed: Jul. 20, 2022

(65) Prior Publication Data

US 2022/0357501 A1 Nov. 10, 2022

Related U.S. Application Data

(63) Continuation of application No. PCT/CN2021/072520, filed on Jan. 18, 2021.

(30) Foreign Application Priority Data

Jan. 21, 2020 (CN) .......................... 202010073177.X

(51) Int. Cl.
*F21V 8/00* (2006.01)
*G06V 40/13* (2022.01)

(52) U.S. Cl.
CPC ......... *G02B 6/0055* (2013.01); *G02B 6/0088* (2013.01); *G06V 40/1318* (2022.01)

(58) Field of Classification Search
CPC . G02B 6/0055; G02B 6/0088; G06V 40/1318
See application file for complete search history.

(56) References Cited

U.S. PATENT DOCUMENTS 10,303,921 B1\* 5/2019 He .................... G02F 1/13318
2017/0270340 A1 9/2017 Gao et al.
(Continued)

FOREIGN PATENT DOCUMENTS

CN 109270988 A 1/2019
CN 110546649 A 12/2019
(Continued)

OTHER PUBLICATIONS

International Search Report issued in corresponding International Application No. PCT/CN2021/072520, dated Apr. 19, 2021, 4 pages.
(Continued)

*Primary Examiner* — Mary Ellen Bowman
(74) *Attorney, Agent, or Firm* — IPX PLLC

(57) ABSTRACT

An electronic device is provided. The electronic device includes: a device body, a display module, a backlight module, and a fingerprint identification assembly. The display module is disposed on a surface of the device body. The backlight module includes a bearing frame and a light guide assembly. The bearing frame is fixedly disposed in the device body. The bearing frame is provided with a first through hole. The light guide assembly is disposed on the bearing frame. A first gap is formed between the light guide assembly and the display module. The fingerprint identification assembly includes a transmitter and a receiver. The transmitter is disposed in the first gap. The receiver is disposed on a side of the bearing frame away from the light guide assembly and is corresponding to a position of the first through hole.

19 Claims, 2 Drawing Sheets

(56) References Cited

U.S. PATENT DOCUMENTS

| | | | |
|---|---|---|---|
| 2018/0005005 A1* | 1/2018 | He | G06F 3/0418 |
| 2018/0260602 A1* | 9/2018 | He | A61B 5/681 |
| 2019/0012512 A1* | 1/2019 | He | G02F 1/13338 |
| 2019/0034020 A1* | 1/2019 | He | G02F 1/13338 |
| 2020/0073447 A1* | 3/2020 | Zhang | G06F 1/1684 |

FOREIGN PATENT DOCUMENTS

| | | | |
|---|---|---|---|
| CN | 110673398 A | 1/2020 | |
| CN | 111259847 A | 6/2020 | |
| WO | 2019210572 A1 | 11/2019 | |

OTHER PUBLICATIONS

First Office Action issued in related Chinese Application No. 202010073177.X, dated Mar. 31, 2023, 7 pages.

* cited by examiner

ELECTRONIC DEVICE

CROSS-REFERENCE TO RELATED APPLICATIONS

This application is a continuation of International Application No. PCT/CN2021/072520, filed on Jan. 18, 2021, which claims priority to Chinese Patent Application No. 202010073177.X filed on Jan. 21, 2020. The entire contents of each of the above-referenced applications are expressly incorporated herein by reference.

TECHNICAL FIELD

The present disclosure belongs to the technical field of consumer electronic devices, and in particular, to an electronic device.

BACKGROUND

In recent years, with the rapid development of semiconductors, MEMS (micro-electro-mechanical systems), touch screens, and other technologies, consumer electronic devices such as smartphones and tablet computers have become indispensable items in consumers' daily lives. In order to provide consumers with better display effects, the display screens of consumer electronic devices are gradually improved as full screens.

The full-screen design of consumer electronic devices indicates a high screen-to-body ratio and a narrow bezel design of four sides. This requires that the fingerprint identification module used for unlocking or payment functions can only be disposed on the rear face or the side of the electronic device. However, since it is difficult to dispose the fingerprint identification module located on the side or the rear face in an area suitable for the hand to touch when holding the electronic device, the utilization rate of such fingerprint identification module is not high, and it is not popular among consumers.

In addition, for the new OLED touch screen, due to self-luminous characteristics thereof, optical fingerprint identification may be realized in the display module or under the display module, and the ultrasonic module may also be disposed under the flexible OLED panel to realize fingerprint sensing. However, due to the characteristics of structure thereof and performance, it is difficult for the LCD touch screen that is in line with the mainstream market to realize the identification function of the fingerprint identification module in the display module or under the display module.

SUMMARY

One purpose of the present disclosure is to provide an improved electronic device.

According to an aspect of the present disclosure, there is provided an electronic device, including:

a device body, a display module, a backlight module, and a fingerprint identification assembly, where the display module is disposed on a surface of the device body, the backlight module includes a bearing frame and a light guide assembly, the bearing frame is fixedly disposed in the device body, and the bearing frame is provided with a first through hole, the light guide assembly is disposed on the bearing frame, and a first gap is formed between the light guide assembly and the display module; and the fingerprint identification assembly includes a transmitter and a receiver, the transmitter is disposed in the first gap, and the receiver is disposed on a side of the bearing frame away from the light guide assembly and is corresponding to a position of the first through hole.

In some embodiments, the light guide assembly is provided with a light guide plate, and the light guide plate has a flat surface at a position corresponding to the first through hole.

In some embodiments, the light guide assembly is provided with a reflective film, and a second through hole is formed on the reflective film at a position corresponding to the first through hole.

In some embodiments, the backlight module includes a circuit board, the light guide assembly is provided with an optical film layer, there is provided with a second gap between the circuit board and the optical film layer, and a position of the first through hole is corresponding to a position of the second gap.

In some embodiments, the backlight module includes a circuit board, the circuit board is disposed on the light guide assembly, and the transmitter is electrically connected to the circuit board.

In some embodiments, a distance between the light guide assembly and the display module ranges from 0.3 mm to 1.4 mm.

In some embodiments, the backlight module further includes a circuit board and a side light source;

the light guide assembly is provided with a reflective film, a light guide plate, and an optical film layer, the optical film layer is disposed on a side of the light guide plate close to the display module, the reflective film is disposed on a side of the light guide plate away from the display module, and the reflective film is in contact with the bearing frame; and the circuit board is disposed on the light guide plate, the side light source is disposed on the circuit board, the side light source is electrically connected to the circuit board, and the side light source is located at an edge of the light guide plate.

In some embodiments, the display module is divided into a display area and a non-display area, and a position of the transmitter is corresponding to a position of the non-display area.

In some embodiments, a position of the receiver is corresponding to the position of the non-display area, and the position of the first through hole is corresponding to the position of the non-display area.

In some embodiments, the backlight module includes a circuit board, the light guide assembly is provided with an optical film layer, there is provided with a second gap between the circuit board and the optical film layer, and a position of the first through hole is corresponding to a position of the second gap;

the display module is divided into a display area and a non-display area, the position of the transmitter is corresponding to the position of the non-display area, the position of the receiver is corresponding to the position of the non-display area, and the position of the first through hole is corresponding to the position of the non-display area; and the optical film layer extends to a position corresponding to the non-display area, and a width of the second gap is greater than a distance from an edge of the optical film layer to the display area.

One technical effect of the present disclosure is that the fingerprint identification assembly is disposed below the display module of the electronic device, which is convenient to use.

Other features and advantages of the present disclosure will become apparent from the following detailed description of examples of the embodiments of the present disclosure with reference to the accompanying drawings.

BRIEF DESCRIPTION OF DRAWINGS

The accompanying drawings, which are incorporated in and constitute a part of the specification, illustrate the embodiments of the present disclosure and together with the description serve to explain the principles of the present disclosure.

DETAILED DESCRIPTION

Various exemplary embodiments of the present disclosure will now be described in detail with reference to the accompanying drawings. It should be noted that the relative arrangement of components and steps, numeric expressions, and numeric values described in these embodiments do not limit the scope of the present disclosure unless otherwise specified.

The following description of at least one example of the embodiments is merely illustrative in fact, and by no means serves as any limitation to the present disclosure and application or use thereof.

The technology, method, and device known to those of ordinary skill in the relevant fields may not be discussed in detail, but if appropriate, the technology, method, and device should be regarded as part of the specification.

In all examples shown and discussed herein, any specific values should be construed as illustrative only and not as a limitation. Therefore, other examples of the embodiments may have different values.

It should be noted that similar numerals and letters refer to similar items in the following accompanying drawings, and therefore, once an item is defined in a figure, further discussion is not required for the item in subsequent figures.

Figure 1:
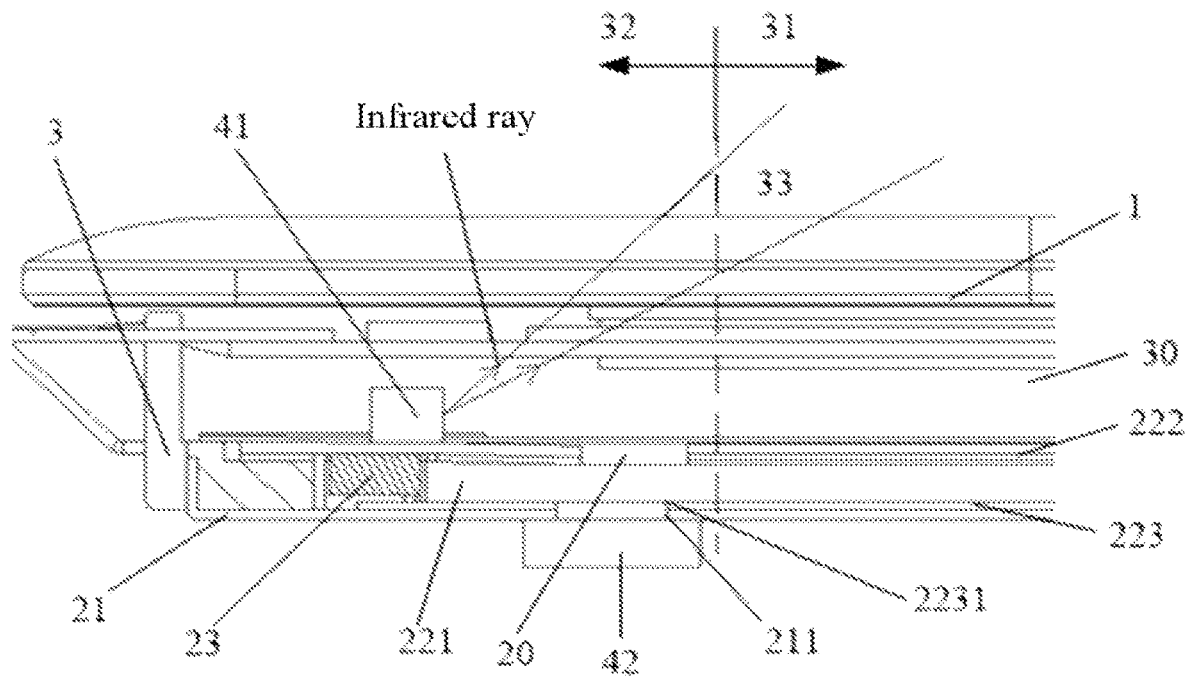
FIG. 1 is a schematic diagram of an internal side of an electronic device according to an embodiment of the present disclosure.

The present disclosure provides an electronic device, as shown in FIG. 1, the electronic device includes a device body 3, a display module 1, a backlight module, and a fingerprint identification assembly. The fingerprint identification assembly is disposed below the display module 1 for realizing fingerprint identification by placing a finger on the display module, which is convenient for detection. The present disclosure does not limit the specific form of the electronic device, which may be a smart electronic device using the display module and the touch screen, such as a mobile phone, a tablet computer, and a computer.

As shown in FIG. 1, the display module 1 is disposed on the device body 3, and is located on the surface of the device body 3. The display module 1 may be made of a plurality of layers of light-transmitting materials for display effects, which is not limited in the present disclosure.

The backlight module includes a bearing frame 21 and a light guide assembly, and the backlight module is used to project light to the display module 1, so that a predetermined picture is displayed on the display module 1. The backlight module may adopt the liquid crystal display technology, and the display module 1 adopts the touch screen technology, so that the backlight module and the display module 1 may be combined to form a liquid crystal touch screen.

As shown in FIG. 1, the backlight module includes a bearing frame 21 and a light guide assembly. The bearing frame 21 is fixedly disposed in the device body 3 for bearing other components of the backlight module in the electronic device. The light guide assembly is disposed on the bearing assembly. The light guide assembly is used to guide the light generated by the light source in the backlight module to the display module 1. A first gap 30 is formed between the light guide assembly and the display module 1. The light guide assembly and the display module 1 may be distributed in a substantially parallel manner, and the first gap 30 is formed in a thickness direction of the electronic device. Intervened by the light guide assembly therein, the light generated by the backlight module passes through the first gap 30 and is irradiated on the display module 1 for imaging.

As shown in FIG. 1, the fingerprint identification assembly includes a transmitter 41 and a receiver 42. The transmitter is disposed at the first gap 30 between the foregoing display module 1 and the light guide assembly. The transmitter 41 is configured to be capable of irradiating infrared rays from an inner side of the display module 1 to the display module 1. The receiver 42 is disposed on a side of the bearing frame 21 away from the light guide assembly. At least one first through hole 221 is formed on the bearing frame 21. The position of the receiver 42 is corresponding to the position of the first through hole 221, so that the light reflected from the display module 1 back to the light guide assembly may pass through the first through hole 221 to irradiate on the receiver 42.

Figure 2:
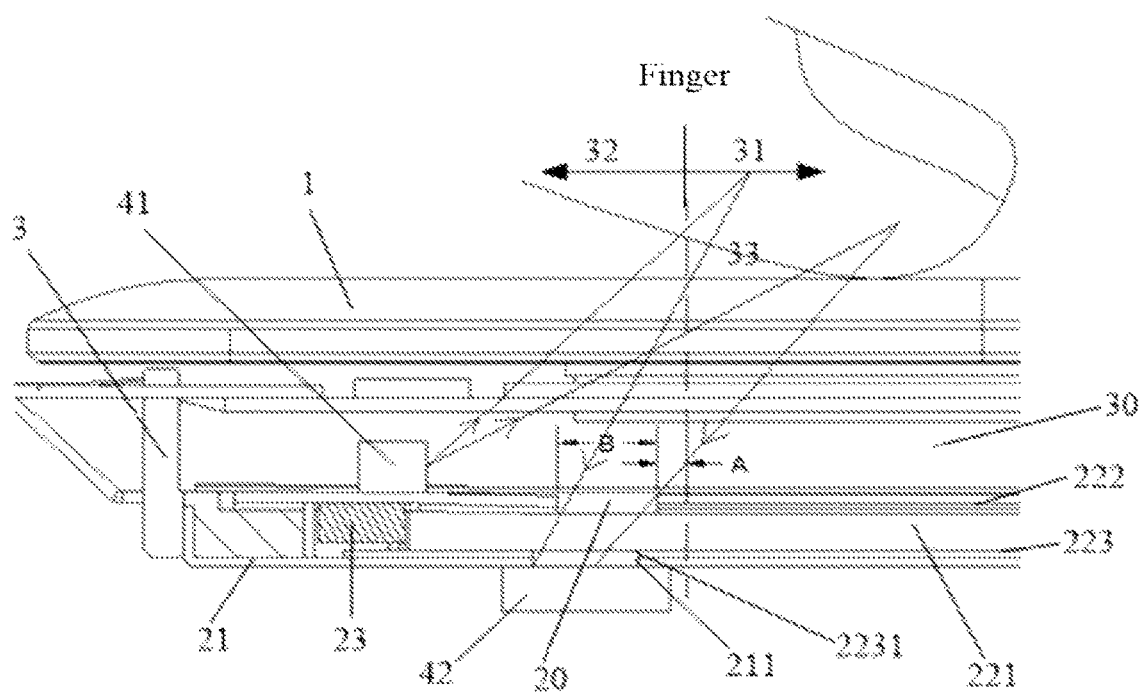
FIG. 2 is a schematic diagram of a fingerprint detection function of an embodiment shown in FIG. 1.

FIG. 2 shows an optical path of infrared rays in the practical application of the present disclosure. The display module 1 may be marked with a fingerprint identification area 33, or the fingerprint identification area 33 is displayed on the display module 1 through the backlight module, which is not limited in the present disclosure. The transmitter 41 emits infrared rays to the display module 1, and the infrared rays cover the fingerprint identification area 33 described above. The user of the electronic device places a finger on the fingerprint identification area, the infrared rays irradiated on the fingerprint identification area may be irradiated on the finger, and then the infrared rays are reflected downward into the display module 1. Further, the infrared rays may pass through the display module 1 and the light guide assembly. The infrared rays reflected by the finger carry fingerprint information, and a part of the infrared rays can pass through the first through hole 221 after being reflected, and then be received by the receiver 42.

The receiver may analyze the received infrared rays, or send signals generated by the infrared rays to a processing unit for analysis, so that the electronic device may obtain the fingerprint information carried by the infrared rays, thereby realizing fingerprint identification.

The technical solution provided in the present disclosure can realize fingerprint identification on the display screen of the electronic device, making it more convenient to apply fingerprint identification. In particular, the technical solution is applicable to an electronic device using a liquid crystal touch screen. The transmitter 41 is disposed in the first gap 30, and the infrared rays emitted by the transmitter 41 may not be interfered and affected by the backlight module, and therefore, the reliability is higher. The receiver 42 for receiving and analyzing infrared rays occupies a large space and is difficult to be disposed in the first gap 30. In the present disclosure, the receiver 42 is disposed on a side of the backlight module away from the display module 1, namely, disposed inside the device body 3. The bearing frame 21 may block the infrared rays. In the present disclosure, the bearing frame 21 is provided with the first through hole 221, so that the infrared rays can be irradiated on the receiver 42 located under the bearing frame 21 for identifying and analyzing the infrared rays.

In some embodiments, as shown in FIG. 1, the light guide assembly may have a light guide plate 221, and the light guide plate 221 may be made of a light guide material such as glasses. Due to the feature of allowing light to pass through, in the backlight module, the light guide plate 221 is used to guide the light generated by a display lamp to the display module 1. In practical applications, after surface treatment such as dot treatment, embossing treatment, and the like, the light guide plate 221 can better guide the light, process the light generated by the display lamp, and then improve picture effect presented on the display module of the electronic device. Since the light guide plate 221 is a part of the light guide assembly, the infrared rays reflected from the surface of the display module through the finger may pass through the light guide plate 221, and then be irradiated on the receiver 42 through the first through hole 221. Patterns on the light guide plate 221 may interfere with the infrared rays. In some embodiments, the light guide plate 221 may have a flat surface at a position corresponding to the first through hole 211. For example, two sides of the light guide plate 221 corresponding to the first through hole 211 may be mirror-finished to form a flat mirror structure, which is convenient for infrared rays to pass through directly and reduces the optical phenomena of refraction, reflection, interference, and diffraction, thereby ensuring the authenticity of the information carried by the infrared rays, namely, reducing distortion. In some embodiments, the surface of the light guide plate corresponding to the first through hole may be processed without the dot treatment and the embossing treatment.

In some embodiments, the light guide assembly may also have a reflective film 223, and the reflective film 223 is used to reflect the light in the backlight module that cannot be transmitted to the display module, so that the light can be irradiated to the display module for imaging. As a component of the light guide assembly, the reflective film 223 may reflect the infrared rays based on the characteristics of structure distribution, so that the infrared rays cannot be irradiated on the receiver 42. In some embodiments, in the implementation shown in FIG. 1 and FIG. 2, the reflective film 223 is provided with a second through hole 2231 at the position corresponding to the first through hole 221, so that the infrared rays can be irradiated on the receiver 42 for fingerprint identification. In other implementations, due to different structures and materials of the light guide assemblies, the reflective film may not cover the receiver 42 and/or the first through hole 221, and the reflective film may also not reflect the infrared rays. In an implementation, the reflective film is provided with the second through hole 2231, which can improve the reliability of the fingerprint identification function.

In some embodiments, as shown in FIG. 1 and FIG. 2, the backlight module may include a circuit board, and the circuit board is used to control and supply power to the side light sources 23 of the backlight module. The light guide assembly may also have an optical film layer 222, and the optical film layer 111 is used to produce optical effects such as refraction and interference on light for better imaging effects. In the implementation in which the light guide assembly includes the optical film layer 222 and the foregoing light guide plate 221, as shown in FIG. 1 and FIG. 2, the optical film layer 222 may be disposed on a side of the light guide plate 221 close to the display module 1. A second gap 20 is left between the circuit board and the optical film layer 222 to prevent the circuit board from interfering with the optical film layer 222 or causing structural extrusion and deformation. In some embodiments, the position of the second gap 20 may be corresponding to the position of the first through hole 221, and the infrared rays reflected back into the device body 3 passes through the second gap 20, and then passes through the first through hole 221, to be irradiated to the receiver 42. Since the optical film layer can play an optical processing role, and can refract, diffract, and interfere with the light, the optical film layer is likely to interfere with the infrared rays. In the foregoing implementation, it may be avoided that the infrared rays irradiated on the receiver 42 is interfered by the optical film layer, and the second gap that needs to be designed between the circuit board and the optical film layer is utilized. This implementation improves space utilization, reduces the distortion rate of the infrared rays, and improves the accuracy and reliability of fingerprint identification.

In some embodiments, as shown in FIG. 1, the circuit board of the backlight module may be directly disposed on the light guide assembly, for example, disposed on the foregoing light guide plate 221. The light guide plate 221 may be designed to be of an area that is large enough to carry the circuit board and the optical film layer 222. Then the transmitter 41 is electrically connected to the circuit board. The circuit board may control the characteristics of the transmitter, such as on and off, irradiation intensity, light type, and the like. The circuit board is used to control the side light source. The transmitter is connected to the circuit board, which may not only save circuits, but also conforms to the performance characteristics of the circuit board, and it is not necessary to configure a circuit board separately for the transmitter.

In an implementation of the present disclosure, the transmitter may be in the form of a specific irradiation angle, and radiate infrared rays toward a direction of the display module. The infrared rays that can be reflected back to the receiver through the surface of the display module and the finger of the user are the infrared rays that actually work. An upward radiating angle of the transmitter may be 90°-150°. The position of the receiver is staggered from the position of the transmitter, and in this way, the foregoing fingerprint identification area is also staggered from the transmitter. The area of the foregoing fingerprint identification area may be increased by controlling a height of the first gap, so that the user can realize fingerprint identification within a larger area of the display module by touching. In some embodiments, a distance between the light guide assembly and the display module ranges from 0.3 mm to 1.4 mm. Adjusting the height of the first gap within the foregoing range can leave enough space to place the transmitter on the one hand, and leave enough space for general avoidance and assembly for the display module and the backlight module; and on the other hand, the overall thickness of the device body can be controlled as much as possible to avoid the electronic device being too thick, which does not meet the shape requirements.

For the structure of the backlight module, referring to FIG. 1, exemplary structural features are described. The backlight module may further include a circuit board and a side light source 23. The light guide assembly may further have a reflective film 223, a light guide plate 221, and an optical film layer 222. The optical film layer 222 is disposed on a side of the light guide plate 221 close to the display module 1, the reflective film 223 is disposed on a side of the light guide plate 221 away from the display module 1, the entire light guide assembly is disposed on the bearing frame 21, and the reflective film 223 is in contact with the bearing frame 21. The foregoing optical film layer may include a light-shielding tape, an upper light-enhancing film, a lower light-enhancing film, and a diffusing film in a direction from being close to the display module to being away from the display module. These film layer structures of the optical film layer can be used to perform optical processing on the imaged light to improve the imaging effect. The light guide plate may be used as a main structure of the entire backlight structure, and has an enough distribution area for supporting components such as the circuit board and the optical film layer. Then the bearing frame is used to bear other components such as the light guide plate. The side light source may be disposed on the circuit board which is electrically connected to the side light source. In some embodiments, the side light source is located at the edge of the light guide plate, so that the light generated by the side light source can enter the light guide plate more efficiently and act as the backlight.

Figure 3:
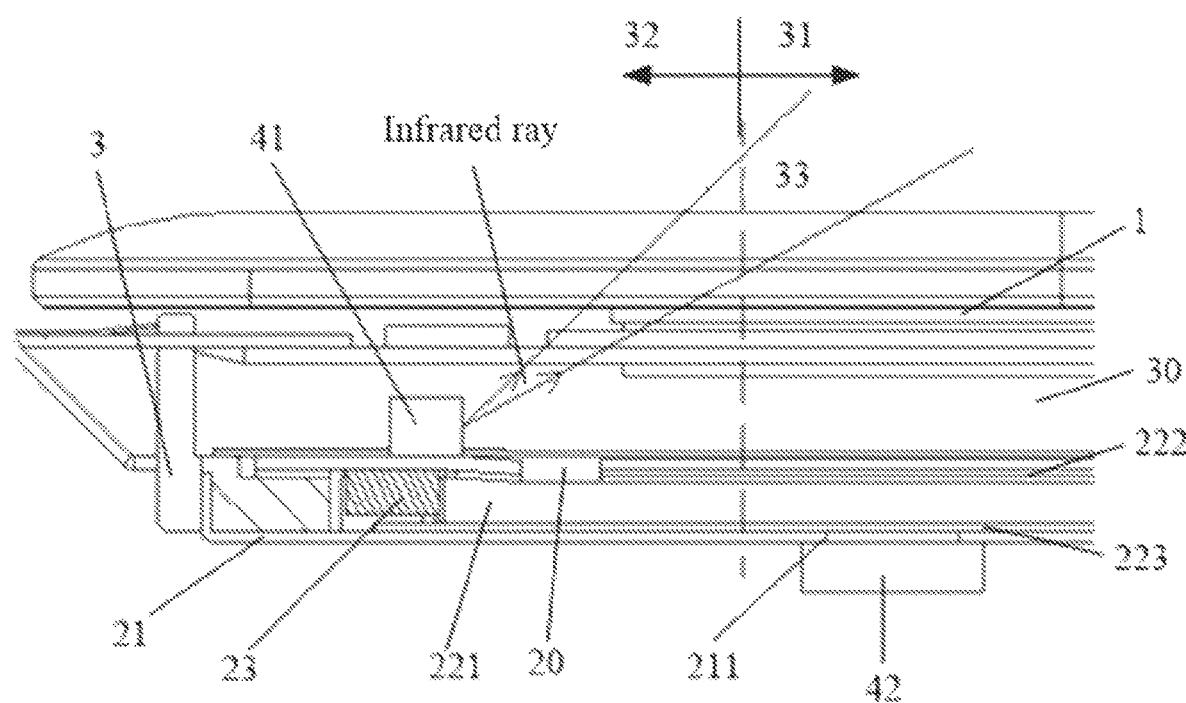
FIG. 3 is a schematic diagram of an internal side of an electronic device according to another embodiment of the present disclosure.

In some embodiments, the display module 1 may be divided into a display area 31 and a non-display area 32. The display area 31 is used to actually image on the display module 1 for the user to view. The non-display area 32 carries components such as the backlight module and the transmitter, and the display module 1 thereon is not used for actual imaging. As shown in FIG. 1 and FIG. 3, the position of the transmitter 41 in the device body is corresponding to the position of the non-display area 32.

In some embodiments, in the implementation shown in FIG. 1 and FIG. 2, the position of the receiver 42 is corresponding to the position of the non-display area 32. In this way, an area of the display area 31 swept by the infrared rays for fingerprint identification is relatively small. In the display area 31, the light guide assembly needs to make relatively few adjustments to deal with the infrared rays to pass through, or does not need to adjust. In the implementation shown in FIG. 1, the first through hole 221 and the second through hole 2231 are not located at positions corresponding to the non-display area 32, and the light guide assembly located at a position corresponding to the position of the display area 31 is not affected.

In the implementation shown in FIG. 3, the receiver 42 is disposed at a position corresponding to the display area 31. Therefore, a part of the infrared rays reflected to the display area 31 finally enters the receiver 42, which is the infrared ray that actually produces the fingerprint identification effect. In this implementation, the bearing frame 21 needs to be provided with the first through hole 221 at the position corresponding to the display area 31. Similarly, the light guide plate 221 may also be provided with a flat surface in the display area 31, and the reflective film 223 may also be provided with the second through hole 2231 at the position corresponding to the display area 31. This design solution may affect the final imaging effect of the backlight module and the display module in this area. In an exemplary implementation, the light guide plate 221, the optical film layer, and the reflective film may also be made of optical materials that do not affect infrared rays. In this way, the foregoing light guide assembly does not need to adjust the optical performance in order to adapt to the infrared rays for penetrating, which may not affect the actual imaging effect. The advantage of the technical solution shown in FIG. 3 is that the position of the fingerprint identification area 33 is closer to the display area 31, and the user has a higher degree of comfort in holding with the hand and touching the fingerprint identification area with the finger, thus, making it more convenient to use.

In the implementation of the present disclosure, the height of the first gap and the position of the receiver in the device body are adjusted, so that the position of the fingerprint identification area can be adjusted.

In some embodiments, in the implementation shown in FIG. 1 and FIG. 2, the transmitter 41 is located at a position corresponding to the non-display area 32, the position of the receiver 42 is corresponding to the position of the non-display area 32, and the position of the first through hole 221 is corresponding to the position of the non-display area 32. An edge of the optical film layer 222 close to the circuit board may extend to the position corresponding to the non-display area 32. A width of the second gap 20 between the circuit board and the optical film layer 222 may be greater than a distance from an edge of the optical film layer to the display area 31. As shown in FIG. 2, this implementation increases the width B of the second gap 20 and reduces the width A from the edge of the circuit board to the display area 31, so that more infrared rays can pass through the second gap 20, which improves the reliability of fingerprint identification. However, extending the edge of the circuit board to the position corresponding to the non-display area 32 can ensure the display effect at the boundary between the display area 31 and the non-display area 32, and reduce the phenomenon of blurred display effect and inconsistent brightness.

Although some embodiments of the present disclosure have been described in detail through examples, those skilled in the art should understand that the foregoing examples are for illustration only and not for the purpose of constituting a limitation on the scope of the present disclosure. It should be understood by those skilled in the art that the foregoing embodiments may be modified without departing from the scope and spirit of the present disclosure. The scope of the present disclosure is defined by the appended claims.

The invention claimed is:

1. An electronic device, comprising:
a device body, a display module, a backlight module, and a fingerprint identification assembly,
wherein:
  the display module is disposed on a surface of the device body,
  the display module is divided into a display area and a non-display area,
  the backlight module comprises a bearing frame and a light guide assembly,
  wherein:
    the bearing frame is fixedly disposed in the device body, and the bearing frame is provided with a first through hole corresponding to the non-display area,
    the light guide assembly is disposed on the bearing frame, and
    a first gap is formed between the light guide assembly and the display module; and
  the fingerprint identification assembly comprises a transmitter and a receiver, wherein the transmitter is disposed in the first gap, and the receiver is disposed on a side of the bearing frame away from the light guide assembly and is located at a position of the first through hole corresponding to the non-display area.

2. The electronic device according to claim 1, wherein the light guide assembly comprises a light guide plate, and the light guide plate has a flat surface at a position corresponding to the first through hole.

3. The electronic device according to claim 1, wherein the light guide assembly comprises a reflective film, and a second through hole is formed on the reflective film at a position corresponding to the first through hole.

4. The electronic device according to claim 1, wherein:
the backlight module comprises a circuit board,
the light guide assembly comprises an optical film layer,
a second gap is provided between the circuit board and the optical film layer, and
a position of the first through hole is corresponding to a position of the second gap.

5. The electronic device according to claim 1, wherein:
the backlight module comprises a circuit board,
the circuit board is disposed on the light guide assembly, and
the transmitter is electrically connected to the circuit board.

6. The electronic device according to claim 1, wherein a distance between the light guide assembly and the display module ranges from 0.3 mm to 1.4 mm.

7. The electronic device according to claim 1, wherein:
the backlight module further comprises a circuit board and a side light source,
wherein:
the circuit board is disposed on the light guide plate,
the side light source is disposed on the circuit board,
the side light source is electrically connected to the circuit board, and
the side light source is located at an edge of the light guide plate, and
the light guide assembly comprises a reflective film, a light guide plate, and an optical film layer,
wherein:
the optical film layer is disposed on a side of the light guide plate close to the display module,
the reflective film is disposed on a side of the light guide plate away from the display module, and
the reflective film is in contact with the bearing frame.

8. The electronic device according to claim 1, wherein a position of the transmitter is corresponding to a position of the non-display area.

9. The electronic device according to claim 1, wherein:
the backlight module comprises a circuit board,
the light guide assembly comprises an optical film layer, wherein a second gap is provided between the circuit board and the optical film layer, and a position of the first through hole is corresponding to a position of the second gap,
the display module is divided into a display area and a non-display area,
wherein:
the position of the transmitter is corresponding to the position of the non-display area,
the optical film layer extends to a position corresponding to the non-display area, and
a width of the second gap is greater than a distance from an edge of the optical film layer to the display area.

10. The electronic device according to claim 2, wherein:
the backlight module further comprises a circuit board and a side light source,
wherein:
the circuit board is disposed on the light guide plate,
the side light source is disposed on the circuit board,
the side light source is electrically connected to the circuit board, and
the side light source is located at an edge of the light guide plate, and
the light guide assembly comprises a reflective film, a light guide plate, and an optical film layer,
wherein:
the optical film layer is disposed on a side of the light guide plate close to the display module,
the reflective film is disposed on a side of the light guide plate away from the display module, and
the reflective film is in contact with the bearing frame.

11. The electronic device according to claim 3, wherein:
the backlight module further comprises a circuit board and a side light source,
wherein:
the circuit board is disposed on the light guide plate,
the side light source is disposed on the circuit board,
the side light source is electrically connected to the circuit board, and
the side light source is located at an edge of the light guide plate, and
the light guide assembly comprises a reflective film, a light guide plate, and an optical film layer,
wherein:
the optical film layer is disposed on a side of the light guide plate close to the display module,
the reflective film is disposed on a side of the light guide plate away from the display module, and
the reflective film is in contact with the bearing frame.

12. The electronic device according to claim 4, wherein:
the backlight module further comprises a circuit board and a side light source,
wherein:
the circuit board is disposed on the light guide plate,
the side light source is disposed on the circuit board,
the side light source is electrically connected to the circuit board, and
the side light source is located at an edge of the light guide plate, and
the light guide assembly comprises a reflective film, a light guide plate, and an optical film layer,
wherein:
the optical film layer is disposed on a side of the light guide plate close to the display module,
the reflective film is disposed on a side of the light guide plate away from the display module, and
the reflective film is in contact with the bearing frame.

13. The electronic device according to claim 5, wherein:
the backlight module further comprises a circuit board and a side light source, wherein:
the circuit board is disposed on the light guide plate,
the side light source is disposed on the circuit board,
the side light source is electrically connected to the circuit board, and
the side light source is located at an edge of the light guide plate, and
the light guide assembly comprises a reflective film, a light guide plate, and an optical film layer,
wherein:
the optical film layer is disposed on a side of the light guide plate close to the display module,
the reflective film is disposed on a side of the light guide plate away from the display module, and
the reflective film is in contact with the bearing frame.

14. The electronic device according to claim 6, wherein:
the backlight module further comprises a circuit board and a side light source,
wherein:
the circuit board is disposed on the light guide plate,
the side light source is disposed on the circuit board,
the side light source is electrically connected to the circuit board, and
the side light source is located at an edge of the light guide plate, and
the light guide assembly comprises a reflective film, a light guide plate, and an optical film layer,
wherein:
the optical film layer is disposed on a side of the light guide plate close to the display module,
the reflective film is disposed on a side of the light guide plate away from the display module, and
the reflective film is in contact with the bearing frame.

15. The electronic device according to claim 2, wherein a position of the transmitter is corresponding to a position of the non-display area.

16. The electronic device according to claim 3, wherein a position of the transmitter is corresponding to a position of the non-display area.

17. The electronic device according to claim 4, wherein a position of the transmitter is corresponding to a position of the non-display area.

18. The electronic device according to claim 5, wherein a position of the transmitter is corresponding to a position of the non-display area.

19. The electronic device according to claim 6, wherein a position of the transmitter is corresponding to a position of the non-display area.

* * * * *